United States Patent Office 3,250,806
Patented May 10, 1966

3,250,806
FLUOROCARBON ETHERS OF TETRAFLUORO-
ETHYLENE EPOXIDE
Joseph Leo Warnell, Wilmington, Del., assignor to E. I.
du Pont de Nemours and Company, Wilmington, Del.,
a corporation of Delaware
No Drawing. Filed Apr. 5, 1962, Ser. No. 185,232
5 Claims. (Cl. 260—535)

The present invention relates to novel fluorocarbon ethers and a method for their production. More specifically, the invention relates to fluorocarbon ethers obtained by the reaction of tetrafluoroethylene epoxide with fluorocarbon acid fluorides.

The novel fluorocarbon ethers of the present invention have the formula $$XR'_f\text{—}O\text{—}(CF_2\text{—}CF_2\text{—}O)_nCF_2\text{—}COY \quad (I)$$

$$YOC\text{—}CF_2\text{—}(O\text{—}CF_2\text{—}CF_2\text{—})_nO\text{—}R''_f\text{—}O$$
$$\text{—}(CF_2\text{—}CF_2\text{—}O\text{—})_mCF_2\text{—}COY \quad (II)$$

and $$YOC\text{—}R'''_f\text{—}O\text{—}(CF_2\text{—}CF_2\text{—}O\text{—})_nCF_2COY \quad (III)$$

where X is a halogen or a hydrogen, $R'_f$ a perfluoroalkylene radical, and preferably a perfluoroalkylene radical of one to ten carbon atoms, with the proviso that when X is other than fluorine, $R'_f$ contains at least two carbon atoms, $R''_f$ is a perfluoroalkylene radical of at least two carbon atoms, and preferably a perfluoroalkylene radical of two to ten carbon atoms, $R'''_f$ is a perfluoroalkylene radical, and perferably a perfluoroalkylene radical of one to ten carbon atoms, n and m are integers representing the number of —$CF_2$—$CF_2$—O— units in the molecule, said integers being in the range of zero to twenty, and —COY is a carboxylic acid group or a carboxylic acid derivative group.

The fluorocarbon ethers of the present invention are obtained by reacting tetrafluoroethylene epoxide,

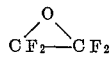

with a substantially fluorinated or perfluorinated acid fluoride which can be the fluoride of a monobasic or a dibasic acid, or with a substantially perfluorinated ketone which can be linear or cyclic in structure. The reaction is carried out in a solvent or diluent at temperatures of −80 to +50° C. with the aid of a catalyst. The catalyst is a quaternary ammonium fluoride, $R_4N^+F^-$, in which R is a hydrocarbon radical, and, preferably, an aliphatic hydrocarbon radical of one to eighteen carbon atoms. Although the actual catalyst is the quaternary fluoride, any quaternary ammonium salt having the $R_4N^+$ radical may be employed since the quaternary fluoride is formed in situ by reaction of the quaternary salt with either the acid fluoride or tetrafluoroethylene epoxide. The formation of the fluoride takes place at all suitable reaction conditions. Thus, such salts are carboxylates, chlorides, iodides, bromides, cyanides, and quaternary salts of other monovalent anions are suitable. Examples of the quaternary ammonium salts useful in the present invention are tetraethyl ammonium cyanide, tetraethyl ammonium bromide, tetrabutyl ammonium acetate, trimethylcetyl ammonium fluoride, and dimethyl dibutyl ammonium cyanide.

The reaction of tetrafluoroethylene epoxide with the acid fluoride or the ketone is carried out in a liquid reaction medium also herein-described as a solvent or diluent. The solvents employed are liquid halogenated alkanes capable of dissolving the quaternary ammonium salt catalysts in the catalytic concentrations required and capable of dissolving tetrafluoroethylene epoxide without reacting with the tetrafluoroethylene epoxide. The suitable halogenated alkanes generally contain from one to twelve carbon atoms. It was found that halogenated alkanes in which the ratio of halogen to carbon was at least 1:1 are capable of dissolving tetrafluoroethylene epoxide and are inert toward the epoxide. Sufficient solubility with respect to the catalyst is established by testing the solubility of the haloalkane with respect to tetramethyl ammonium fluoride. If the halogenated alkane is able to dissolve at least 0.001 weight percent of the quaternary fluoride at normal temperatures, it can be employed in the process of the present invention. This test, therefore, provides a simple method of determining those halogenated alkanes which are suitable in the process of the invention. The preferred solvents are those which have the general formula $XC_pF_{2p}CH_2Cl$, in which X is a halogen or a hydrogen and p varies from one to eleven carbon atoms. Examples of other suitable solvents are methylene chloride, chloroform, 1,2-dichloroethane, 1,1,2-trichloroethane and 1,1,2,3-tetrachloropropane.

The catalyst is normally employed in concentrations of 0.001 to 5 percent by weight of the solvent. The solvent is employed in sufficient quantities to maintain a fluid reaction mixture which can be agitated. No specific pressures are required to carry out the reaction. Optimum pressures are determined by the reaction environment.

The acid fluorides employed as reagents in the described process are, as indicated, acid fluorides of perfluorinated acids and omega-hydroperfluoro acids. A general formula for the monobasic acid fluorides is $XC_kF_{2k}COF$, in which X is a halogen or a hydrogen, and k varies from zero to nine, with the proviso that when X is other than fluorine, k is from 1 to 9. The dibasic acid fluorides employed in the described process include the acid fluorides of oxalic acid, perfluoroglutaric acid, perfluoromalonic acid, perfluorofumaric acid, perfluorosuccinic acid, perfluoroadipic acid, and perfluorosebacic acid. Examples of monobasic acid fluorides are carbonyl fluoride, perfluoroacetyl fluoride, perfluoropropionyl fluoride, perfluoroisobutyryl fluoride, perfluoroheptanoyl fluoride, perfluorodecanoyl fluoride, omega-hydroperfluoroheptanoyl fluoride and omega-hydroperfluoropentanoyl fluoride. The preferred perfluoroketones useful in the present invention are perfluoroketones of three to ten carbon atoms such as perfluoroacetone and perfluorocyclohexanone.

One of the advantages of the reaction described is the degree of control that can be exercised over the reaction by the ratios of the acid fluoride and the tetrafluoroethylene epoxide. Thus, if a ratio of one mole of the acid fluoride and 5 moles of tetrafluoroethylene epoxide are reacted, the major reaction product contains one mole of the acid fluoride and five moles of tetrafluoroethylene epoxide. Although a distribution of products differing in degree of polymerization, i.e., number of —$CF_2$—$CF_2$—O— units, is obtained, this distribution is very narrow.

In view of the extreme reactivity of tetrafluoroethylene epoxide, great care should be taken in the handling of tetrafluoroethylene epoxide. Tetrafluoroethylene epoxide, B.P. −63.5±1° C., is prepared by oxidizing tetrafluoroethylene with molecular oxygen using actinic radiation and a trace of chlorine or bromine as an activator.

The invention is further illustrated by the following examples.

Example I

In a 500 ml. copper reactor containing a magnetic stirrer and attached to a manifold was placed 0.43 g. of tetraethylammonium cyanide. The reactor was cooled to −30° C. and 20 ml. of $CHF_2CF_2CH_2Cl$ was added. To this mixture was added 4 g. of tetrafluoroethylene epoxide. Complete consumption of the epoxide occurred, indicating the catalyst to be active and being converted to a quaternary ammonium fluoride. There was then added in sequence 20 g. of perfluoroacetyl fluoride and 40 g. of tetrafluoroethylene epoxide at 30 p.s.i. After the reaction was complete, there was added an additional 79 g. of perfluoroacetyl fluoride and then 286 g. of tetrafluoroethylene epoxide at 15–20 p.s.i. Complete reaction occurred in three hours. The final mole ratio of tetrafluoroethylene epoxide to perfluoroacetyl fluoride charged was 3.3:1. After removal of residual small amounts of perfluoroacetyl fluoride and tetrafluoroethylene epoxide, there was isolated 410 g. of product that, on distillation, yielded:

| Fraction | Weight, g. | Structure | Boiling point, °C. |
|---|---|---|---|
| A | 15 | $C_2F_5OCF_2COF$ | 0–6 |
| B | 69 | $C_2F_5OCF_2OCF_2COF$ | 65–67 |
| C | 171 | $C_2F_5O(C_2F_4O)_2CF_2COF$ | 99–102 |
| D | 103 | $C_2F_5O(C_2F_4O)_3CF_2COF$ | 134–138 |
| E | 33 | $C_2F_5O(C_2F_4O)_4CF_2COF$ | 167–170 |

Fraction A on hydrolysis yielded perfluoroethoxydifluoroacetic acid, B.P. 93–95° C. at 200 mm.

*Analysis.*—Found: C, 20.7; H, 0.45; F, 57.0. Calcd.: C, 20.9; H, 0.44; F, 57.8.

Fraction B on hydrolysis yielded $$C_2F_5OCF_2CF_2OCF_2COOH$$

B.P. 90–95° C. at 100 mm.

*Analysis.*—Found: C, 21.0; H, 0.7; F, 59.9; neutral equivalent 351. Calcd.: C, 20.8; H, 0.29; F, 60.2; neutral equivalent 346.

Fraction C on hydrolysis yielded $$C_2F_5O(C_2F_4O)_2CF_2COOH$$

B.P. 97–98° C. at 16 mm.

*Analysis.*—Found: F, 60.0; neutral equivalent 462. Calcd.: F, 61.8; neutral equivalent 462.

The use of trimethylcetyl ammonium bromide instead of the tetraethylammonium cyanide in the described procedure gives rise to substantially the same result.

Example II

A 500 ml. copper reactor, containing a magnetic stirrer and attached to a manifold, was cooled to −50° C. and charged with 0.4 g. of tetraethylammonium cyanide and 20 ml. of $CHF_2CF_2CH_2Cl$. There was then added 3 g. of tetrafluoroethylene epoxide which was rapidly consumed. There was then added 10 g. of perfluoroethoxyacetyl fluoride mixed with 40 g. of perfluoroacetyl fluoride followed by a total of 221 g. of tetrafluoroethylene epoxide at 30 p.s.i. while the reaction mixture was stirred rapidly at −30 to −15° C. over one hour. Complete absorption of the epoxide occured. There was isolated 269 g. of product having the general structure $C_2F_5O(CF_2CF_2O)_nCF_2COF$, where $n$ varied from zero to six.

Over 80% of the product consisted of compounds wherein $n$ was three, four, and five. The products were identified by gas chromatography and infrared spectra.

Example III

Example I is repeated using tetraethylammonium bromide as the catalyst and methylene chloride as the solvent. Essentially the same product distribution is obtained.

Example IV

Using the procedure of Example I, carbonyl fluoride is reacted with tetrafluoroethylene epoxide using tetraethyl-ammonium cyanide at the catalyst, and $$HCF_2CF_2CF_2CF_2CH_2Cl$$

as the solvent. The product has the structure $$CF_3O(CF_2CF_2O)_nCF_2COF$$

where the value of $n$ is determined by the molar ratio of carbonyl fluoride to tetrafluoroethylene epoxide. Thus, a charge consisting of 0.1 mole of carbonyl fluoride and 0.5 mole of tetrafluoroethylene epoxide gives a product containing over 70% of tetrafluoroethylene epoxide polyethers of the formula indicated above in which $n$ is three, four, and five. The products are identified by gas chromatography, nuclear magnetic resonance (NMR), and infrared spectra as $$CF_3O(CF_2CF_2O)_nCF_2COF$$

Example V

Using the procedure of Example I, perfluoropropionyl fluoride is reacted with tetrafluoroethylene epoxide using tetraethylammonium cyanide as the catalyst, and $$HCF_2CF_2CF_2CF_2CH_2Cl$$

as the solvent. The product has the structure $$CF_3CF_2CF_2O(CF_2CF_2O)_nCF_2COF$$

wherein the value of $n$ is determined by the molar ratio of perfluoroproprionyl fluoride to tetrafluoroethylene epoxide. Thus, a charge consisting of 0.1 mole of perfluoropropionyl fluoride and 0.20 mole of tetrafluoroethylene epoxide gave a product containing over 60% of a fluorocarbon ether having the above formula, wherein $n$ is one and two. Higher ratios of tetrafluoroethylene epoxide result in products having higher $n$ values.

Example VI

Use of dichloroethane, as a solvent, in the procedure of Example IV, gives rise to essentially identical results.

Example VII

In a 500 ml. copper reactor containing a magnetic stirrer and attached to a manifold was placed 0.25 g. of tetraethylammonium cyanide. The reactor was cooled to −80° C. and there was added 15 ml. of $$HCF_2CF_2CH_2Cl$$

and about 1 g. of tetrafluoroethylene epoxide. The reaction mixture was warmed to −20° C. at which temperature consumption of the epoxide occurred. The mixture was cooled to −80° C. and 34 g. of perfluoroglutaryl fluoride was added. The mixture was warmed to −35° C. and 66 g. of tetrafluoroethylene epoxide was added over 90 minutes at 8–15 p.s.i. Complete reaction occurred. The molar ratio of glutaryl fluoride to tetrafluoroethylene oxide charged was 1:4. There was isolated 122 g. of product containing 21 g. of solvent. The crude product was added to 100 ml. of methanol at 0° C. Complete conversion to methyl esters occurred. The methanol was removed by distillation and the residual fluorocarbon fraction was treated with silica gel to remove HF. The product was then distilled to give a series of fractions boiling from 133° C. at 26 mm. to 108° C. at 1 mm., a total of 56.8 ml., weighing 91 g. The fractions were then separated into pure compounds by preparative gas chromatography. The mixture consisted of $CH_3O_2C(CF_2)_4(CF_2CF_2O)_lCF_2CO_2CH_3$ and products of the type $$CH_3O_2CCF_2(OCF_2CF_2)_mO(CF_2)_5$$
$$O(CF_2CF_2O)_nCF_2CO_2CH_3$$

where $l$ had values from zero to five and $m$ and $n$ had values from one to three. The products were characterized by infrared, NMR, and elemental analyses. Typical analyses are indicated below.

| Product | Anal. found | Anal. calcd. |
|---|---|---|
| $CH_3O_2C(CF_2)_4OCF_2CF_2OCF_2CO_2CH_3$ and $CH_3O_2CCF_2O(CF_2)_5OCF_2CO_2CH_3$. | C, 27.7 <br> H, 1.2 <br> F, 53.0 | C, 26.4. <br> H, 1.2. <br> F, 53.2. |
| $CH_3O_2C(CF_2)_4O(CF_2CF_2O)_2CF_2CO_2CH_3$ and $CH_3O_2CCF_2O(CF_2)_5OCF_2CF_2OCF_2CO_2CH_3$. | C, 24.8 <br> H, 0.9 <br> F, 55.2 | C, 25.4. <br> H, 1.0. <br> F, 55.5. |
| $CH_3O_2C(CF_2)_4O(CF_2CF_2O)_3CF_2CO_2CH_3$ and $CH_3O_2CCF_2O(CF_2)_5O(CF_2CF_2O)_2CF_2CO_2CH_3$ and $CH_3O_2CCF_2OCF_2CF_2O(CF_2)_5OCF_2CF_2OCF_2CO_2CH_3$. | C, 24.4 <br> H, 0.7 <br> F, 55.2 | C, 24.5. <br> H, 0.8. <br> F, 57.2. |

*Example VIII*

Using the procedure of Example VII, 49 g. of perfluoroglutaryl fluoride was reacted with 206 g. of tetrafluoroethylene epoxide at −40° to −20° C. A quantitative yield of a mixture of products of the structure $$COFCF_2(OCF_2CF_2)_mO(CF_2)_5O(CF_2CF_2O)_nCF_2COF$$

was obtained where over 90% of the product had values of $m+n$ from four to eight. These compounds were readily converted by the usual methods to diesters, diamides and salts.

*Example IX*

In a dry glass flask containing a magnetic stirrer and attached to a manifold was placed 0.2 g. of tetraethylammonium cyanide. There was added 5 ml. of $$HCF_2CF_2CH_2Cl$$

at −50° C. A small quantity of tetrafluoroethylene epoxide was added and the temperature was warmed to −20° C., at which temperature complete consumption occurred. There was then added 6 g. of oxalyl fluoride. The temperature was raised to 0–4° C. and 13 g. of tetrafluoroethylene epoxide at 10 p.s.i. was added over a period of 2.5 hours. There was isolated 12.8 g. of liquid product together with 6 g. of gaseous material. Distillation of the entire mixture gave small amounts of tetrafluoroethylene epoxide, oxalyl fluoride, perfluoroacetyl fluoride, and some homopolymers of tetrafluoroethylene epoxide of structure $CF_3CF_2O(CF_2CF_2O)_nCF_2COF$.

The major product comprises reaction products of tetrafluoroethylene epoxide and oxalyl fluoride having the general formula $$FOCCF_2(OCF_2CF_2)_nOCF_2COF$$

the composition of which is indicated below.

| $n$ | Weight, g. |
|---|---|
| 0 | 1.7 |
| 1 | 2.0 |
| 2 | 6.0 |
| 3 | 3.7 |

The identity of these products was shown by gas chromatography and infrared analysis.

*Example X*

Using the procedure of Example I hexafluoroacetone is reacted with tetrafluoroethylene epoxide. On distillation of the reaction product the principal fluorocarbon ether fraction B.P. 39–42° C. is largely $$(CF_3)_2CF—O—CF_2COF$$

Higher molecular weight products having the general formula $(CF_3)_2CF—O—(CF_2—CF_2—O)_n—CF_2COF$ where $n$ varies from 1 to 3 are also obtained.

*Example XI*

Into a dry flask, equipped with a magnetic stirrer and a cooling bath, was added 250 mg. of tetraethylammonium cyanide and 20 ml. of $CHF_2CF_2CH_2Cl$. Reaction at −35° C. of the stirred solution with 2 g. of tetrafluoroethylene epoxide converted the salt to the fluoride ion form. Following the addition of 49 g. of bromodifluoroacetyl fluoride the reaction mixture was pressured with tetrafluoroethylene epoxide to 10 p.s.i. at −20° C. The solution was stirred for 1 hour at −20° C. during which time 32 g. of epoxide were absorbed. Complete reaction of the epoxide occurred during an additional 2 hours of stirring at −20° C. Distillation of the reaction mixture gave the following fluorocarbon ethers:

| Compound | Weight, g. | Boiling point, ° C. |
|---|---|---|
| $Br—CF_2CF_2OCF_2COF$ | 7 | 52 to 62. |
| $Br—(CF_2CF_2O)_2—CF_2COF$ | 8.5 | 100 to 103. |
| $Br—(CF_2CF_2O)_3—CF_2COF$ | 10 | 133 to 136. |
| $Br—(CF_2CF_2O)_4—CF_2COF$ | 11.5 | 164 to 169. |
| $Br—(CF_2CF_2O)_5—CF_2COF$ <br> $Br—(CF_2CF_2O)_6—CF_2COF$ | 12 | 195 to 250. |

*Analyses.*—Theory for $C_4F_7O_2Br$: C, 16.4; F, 45.3. Found: C, 16.84; F, 45.44.

Theory for $C_6F_{11}O_3Br$: C, 17.6; F, 51.0. Found: C, 17.84; F, 50.9.

Theory for $Br—(CF_2CF_2O)_5CF_2COF$: C, 19.0; F, 57.6. Found: C, 19.85; F, 57.98.

Similar products are obtained by reaction of $ICF_2COF$ or $HCF_2COF$ with tetrafluoroethylene epoxide under comparable conditions.

*Example XII*

To a clean, dry reactor was added 300 mg. of tetraethylammonium cyanide; the reactor was then attached to a manifold and heated under vacuum at 60° C. for 5–10 minutes. After the reactor had been cooled, 14 ml. of $HCF_2CF_2CH_2Cl$ was added as solvent, and the system was cooled to −35°. Tetrafluoroethylene epoxide was then pressured into the reactor until reaction had begun, as evidenced by a rapid pressure drop after each addition of tetrafluoroethylene epoxide. The system was then cooled to −50° C., and 29.8 g. (0.225 mole) of chlorodifluoroacetyl fluoride was added. The temperature of the system was then maintained at −35° to −40° C. while 70 g. (0.6 mole) of tetrafluoroethylene epoxide was pressured in over a period of 45 minutes. Constant magnetic stirring was maintained throughout the reaction. After all tetrafluoroethylene epoxide had been added, the reaction mixture was allowed to warm gradually to room temperature; the pressure was then 10″ vac. The crude product (98% yield, based on acid fluoride) was distilled in a small spinning band column, and the following pure components were isolated and identified.

| Compound | B.P., deg. | Weight, g. | Conversion [1] |
|---|---|---|---|
| $ClCF_2CF_2OCF_2COF$ | 45 | 3.5 | 6.2 |
| $ClCF_2CF_2OCF_2CF_2OCF_2COF$ | 91–93 | 13.5 | 16.5 |
| $ClCF_2CF_2O(CF_2CF_2O)_2CF_2COF$ | 129–130 | 10.6 | 9.8 |
| $ClCF_2CF_2O(CF_2CF_2O)_3CF_2COF$ | 149–150 | 13.6 | 10.1 |

[1] Based on acid fluoride charged.

Each of the above products was further purified by preparative gas chromatography; the NMR and infrared spectra of the pure samples confirmed the structure of each of the products.

The foregoing examples have illustrated the preparation of novel fluorocarbon ethers and are not intended to limit the scope of the invention. Substitution of catalysts, solvents and acid fluorides other than employed in the examples but described hereinabove, in the procedures set forth in the examples will result in the three types of fluorocarbon ethers which are formed by the reaction of mono- or dibasic acid fluorides with tetrafluoroethylene epoxide. The fluorocarbon ether of type I is formed by the reaction of a monobasic acid fluoride with the epoxide, type II is formed by the reaction of the epoxide with both acid fluoride groups of a dibasic acid fluoride and type III is formed by the reaction of the epoxide with a single acid fluoride group of a dicarboxylic acid. As indicated, the monobasic acid fluoride may also contain a hydrogen or a different halogen in the omega position. Acid fluorides of this type exhibit substantially the same chemical activity as perfluorinated acid fluorides and are, therefore, considered to be of the same class.

The fluorocarbon ethers produced by the process of the present invention contain acid fluoride endgroups. As illustrated by the examples, these acid fluoride endgroups are readily converted into acid endgroups. The fluorocarbon ether acids can be reacted with alcohols, inorganic bases, basic salts and amines to result in carboxylic acid derivatives of the type normally formed with fluorocarbon carboxylic acids which are well known in the art. The term "carboxylic acid derivative" is meant to include only those derivatives which have retained the carbonyl group of the acid. The reactivity of the acid group of the fluorocarbon polyethers of the present invention is equivalent to the reactivity of a fluorocarbon carboxylic acid having the same number of carbon atoms.

The fluorocarbon ethers of the present invention are useful as such or as intermediates. In their acid or salt form these fluorocarbon ethers are useful detergents. They may also be employed as solvents or as heat transfer and dielectric media. In such uses, however, it is preferred to replace the —COY group with a fluorine which is accomplished by decarboxylation of the fluorocarbon ether acid in the presence of fluorine. The resulting fluorine capped products are enhanced in chemical inertness.

Similar products of inherent chemical inertness are obtained by decomposition of alkali metal salts of the acids in the presence of hydroxylic solvents. These products have —COY groups replaced by hydrogen atoms.

I claim:
1. A fluorocarbon ether having the formula

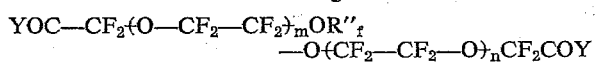

where $R''_f$ is a perfluoroalkylene radical of two to ten carbon atoms, $n$ and $m$ are integers of zero to twenty and —COY is a group selected from the class consisting of the carboxylic acid group and the carboxylic acid fluoride group.

2. A fluorocarbon ether having the formula

where $R'''_f$ is a perfluoroalkylene radical of one to ten carbon atoms, $n$ is an integer of zero to twenty and —COY is a group selected from the class consisting of the carboxylic acid group and the carboxylic acid fluoride group.

3. A fluorocarbon ether having the formula

where $n$ is from zero to twenty and —COY is a group selected from the class consisting of the carboxylic acid group and the carboxylic acid fluoride group.

4. A fluorocarbon ether having the formula

where $n$ is from zero to twenty and —COY is a group selected from the class consisting of the carboxylic acid group and the carboxylic acid fluoride group.

5. The fluorocarbon ether having the formula

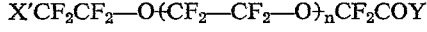

where $n$ is from zero to twenty, —COY is a group selected from the class consisting of the carboxylic acid group and the carboxylic acid fluoride group, and X' is an element selected from the class consisting of chlorine, bromine, iodine and hydrogen.

References Cited by the Examiner
UNITED STATES PATENTS

| | | | |
|---|---|---|---|
| 2,713,593 | 7/1955 | Brice et al. | 260—484 |
| 2,839,513 | 6/1958 | Ahlbrecht | 260—535 X |
| 3,114,778 | 12/1963 | Fritz | 260—535 X |
| 3,125,599 | 3/1964 | Warnell | 260—544 X |

FOREIGN PATENTS 599,948 6/1960 Canada.

LORRAINE A. WEINBERGER, *Primary Examiner.*

DANIEL D. HORWITZ, LEON ZITVER, D. P. CLARKE, R. K. JACKSON, *Assistant Examiners.*